United States Patent [19]
Kikuchi

[11] Patent Number: 5,731,779
[45] Date of Patent: Mar. 24, 1998

[54] DETECTION RANGE ADJUSTING SYSTEM OF OBSTACLE DETECTION APPARATUS FOR VEHICLE

[75] Inventor: Hayato Kikuchi, Wako, Japan

[73] Assignee: Honda Giken Kogyo Kabushiki Kaisha, Tokyo, Japan

[21] Appl. No.: 767,839

[22] Filed: Dec. 17, 1996

[30] Foreign Application Priority Data

Dec. 25, 1995 [JP] Japan ..................................... 7-351073

[51] Int. Cl.$^6$ ..................................................... G01S 13/93
[52] U.S. Cl. .............................................. 342/70; 342/174
[58] Field of Search ............................. 342/70, 174, 173, 342/165

[56] References Cited

U.S. PATENT DOCUMENTS 5,670,962  9/1997  Henderson et al. .................... 342/70

FOREIGN PATENT DOCUMENTS 59-37575   3/1984   Japan .
63-163600  10/1988  Japan .

*Primary Examiner*—Daniel T. Pihulic
*Attorney, Agent, or Firm*—Nikaido, Marmelstein, Murray & Oram LLP

[57] ABSTRACT

A detection range adjusting system of an obstacle detection apparatus for a vehicle having a transmitting-receiving unit mounted on the vehicle for transmitting a detection signal directed over a predetermined range and receiving a reflection signal of the detection signal is provided. This system comprises a detection range setting means for processing the reflection signal and setting a detection range for detecting an obstacle which is included within the predetermined range and narrower than the predetermined range, a standard reflecting body positioned at a predetermined position relative to the vehicle, a standard position storing means for storing a standard position of the standard reflection body in the detection range beforehand, and an adjustment instructing means for instructing transmission of a detection signal for adjustment of the detection range. Setting of the detection range setting means is changed so that a detected position of the standard reflecting body in the detection range detected based on a reflection signal of the detection signal transmitted according to the instruction of the adjustment instructing means coincides with the standard position stored in the standard position storing means.

4 Claims, 9 Drawing Sheets

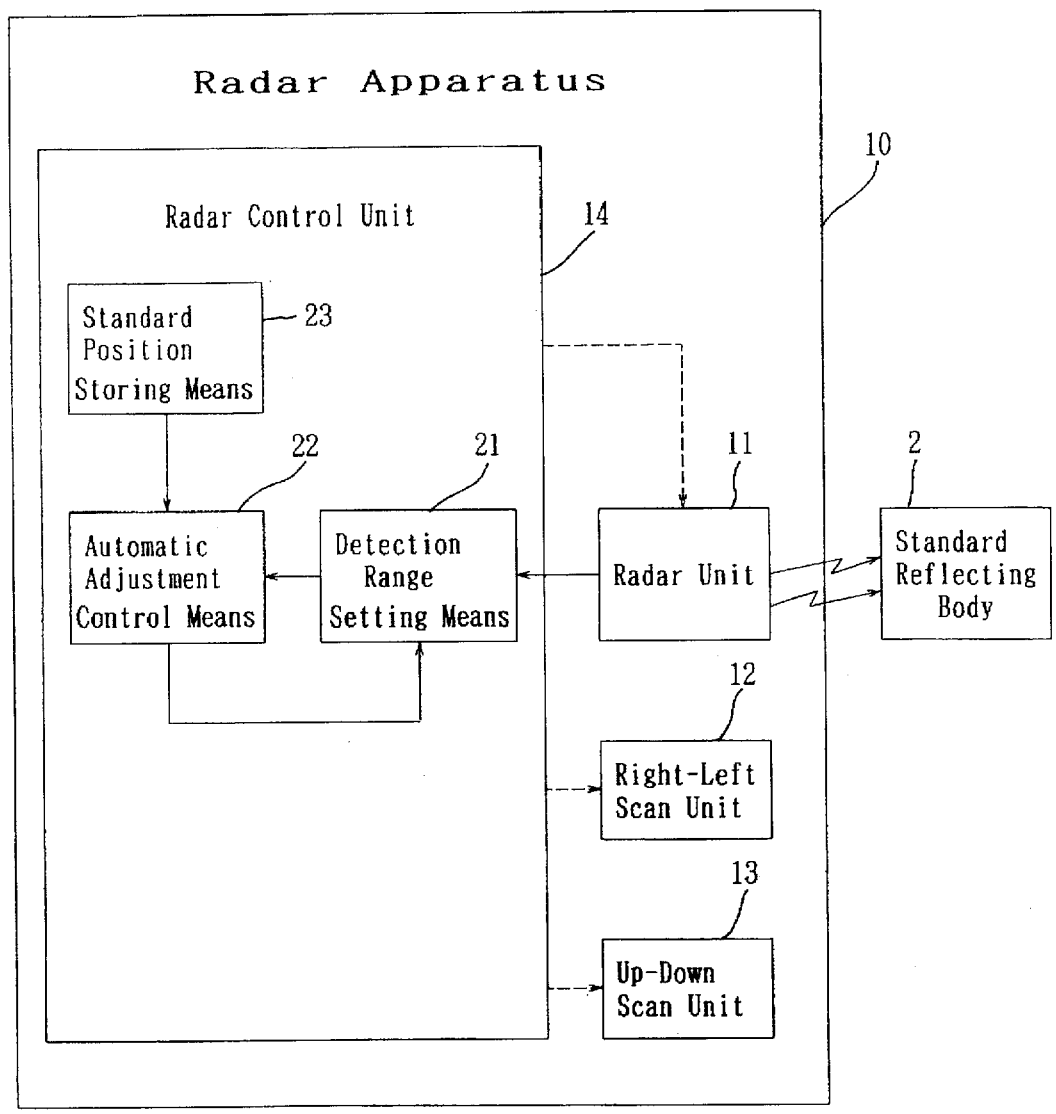
F I G. 4

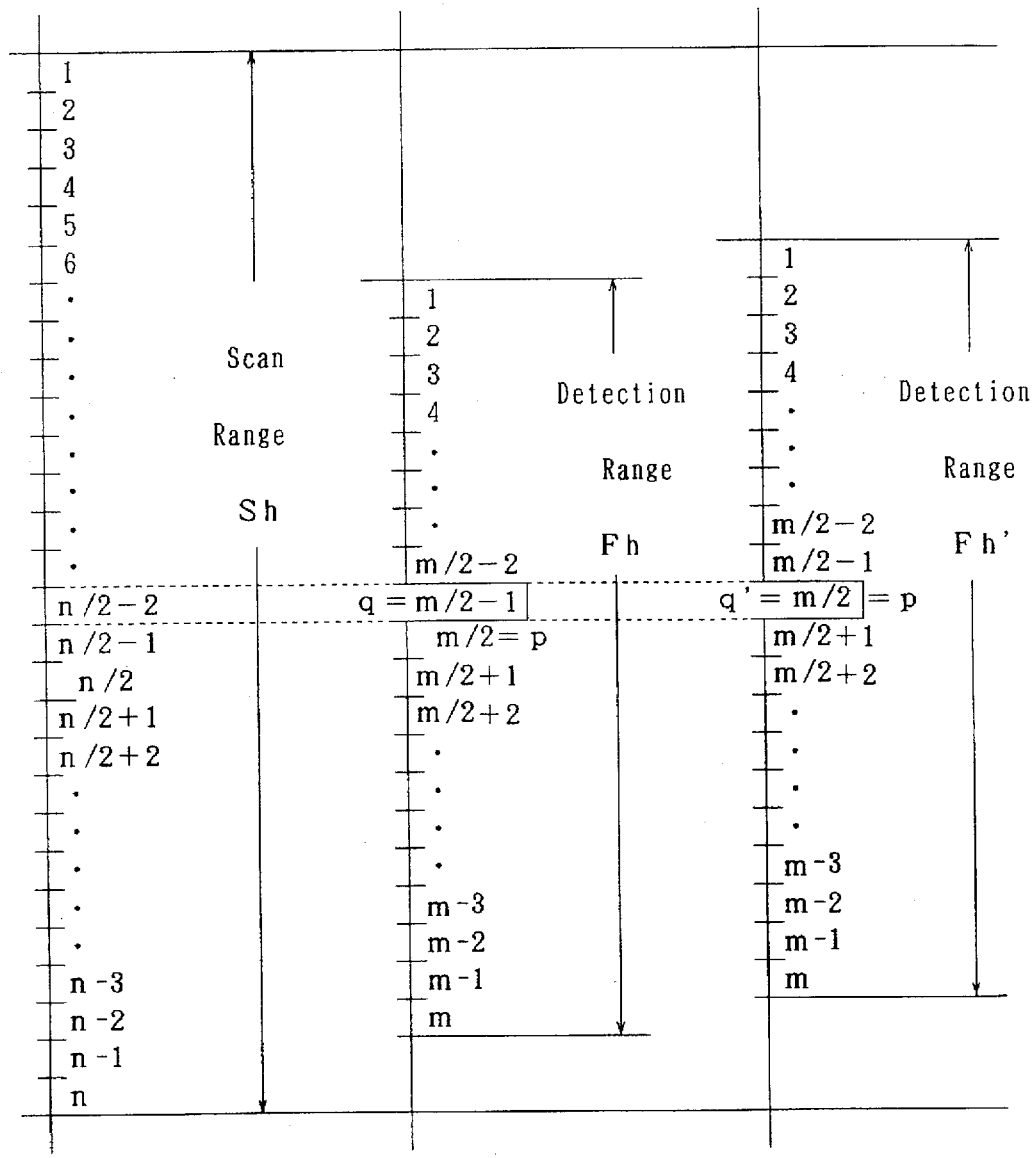
F I G. 5

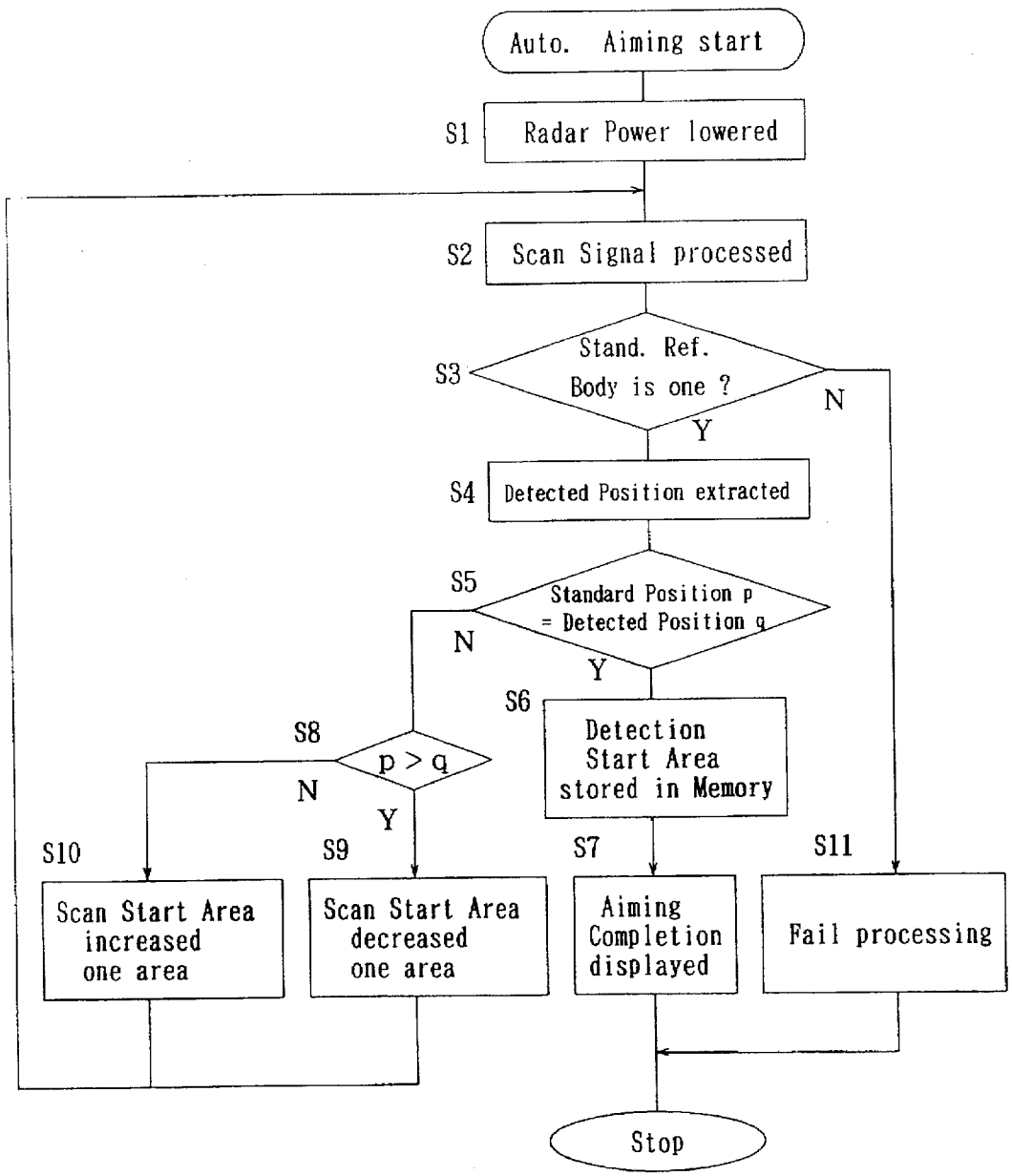
F I G. 6

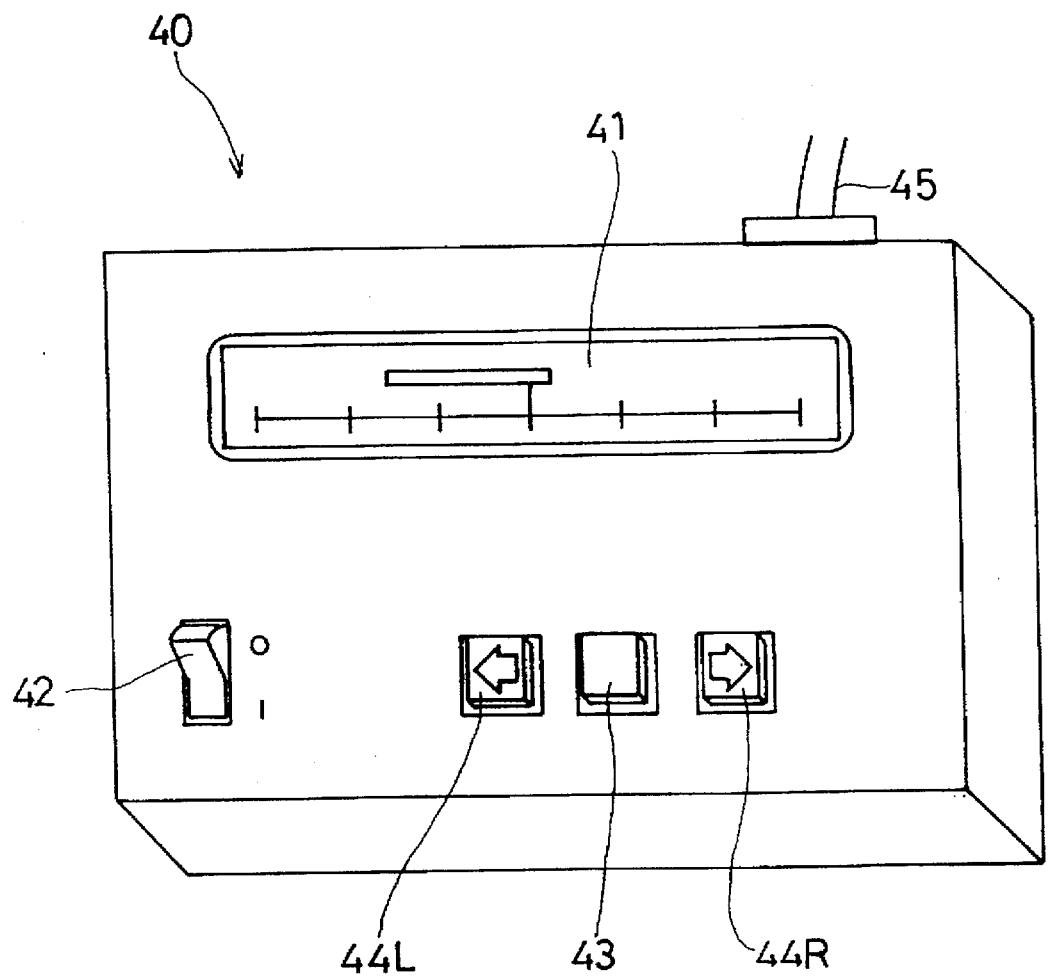
F I G. 9

DETECTION RANGE ADJUSTING SYSTEM OF OBSTACLE DETECTION APPARATUS FOR VEHICLE

BACKGROUND OF THE INVENTION

This invention relates to an obstacle detection apparatus for a vehicle mounted on the vehicle to detect obstacles by transmitting detection signals and receiving reflection signals, and particularly to adjusting the detection range.

The obstacle detection apparatus for a vehicle is a radar apparatus which is mounted on a vehicle, transmits an electromagnetic wave having high directivity as a detection signal and receiving and processing the reflection signal to detect a obstacle and its position.

In the transmitting-receiving unit, since a detection signal having high directivity such as laser beam is transmitted, if transmitting range of the detection signal extends over all directions about the vehicle, there occurs a waste and moreover speed of processing the signals is limited. Therefore the transmitting range of the detection signal is limited within a predetermined range in front of the vehicle.

Accordingly, when the transmitting-receiving unit is installed on the vehicle, it is necessary to adjust range of transmitting direction of the detection signal, that is, to carry out an aiming and the aiming is carried out in case of maintenance too.

Hitherto, the aiming work has been carried out by adjusting installation attitude of the transmitting-receiving unit to the vehicle.

For example, Japanese Laid-Open Utility Model Publication No. Sho 59-37575 (1984) discloses an object detection apparatus utilizing ultrasonic wave having a case housing a transmitting-receiving device, supported rotatably in vertical and horizontal directions, and fixed in a predetermined attitude by a screw to determine a range of transmission of the ultrasonic wave.

In this apparatus, the aiming is carried out by adjusting the attitude of the case suitably in vertical and horizontal directions to a predetermined attitude in a state that the screw is loosened, and then the case is fixed by tightening the screw.

Japanese Laid-Open Utility Model Publication No. Sho 63-163600 (1988) discloses an installing structure of a laser radar sensor in which the laser radar sensor is fixed to a vehicle front structure member by a screw so as to be adjustable positionally. Accordingly, the aiming is carried out by loosening the screw and adjusting the attitude of the sensor similarly to the above-mentioned example.

In the above-described both prior arts, a bracket or the like for aiming adjustment must be used to install a transmitting-receiving device on the vehicle, thereby provision of a special bracket raises cost. In addition, the bracket itself is large to limit its installation place and heavy. There is required a space for adjustment around the transmitting-receiving device to deteriorate space efficiency.

Further, there is an inconvenience that attitude of the transmitting-receiving device is apt to be disturbed on the screwing step after the adjustment.

In case that the aiming is carried out in both horizontal and vertical directions, a previous adjustment in one direction is disturbed more or less when an adjustment in the other direction is carried out after the adjustment in one direction, therefore, a work for repeating the adjustments alternately certain times to pursuit a predetermined attitude is necessary and this work takes time and costs much labor.

Otherwise, since a person carries out the aiming by changing the attitude of the transmitting-receiving device, a dispersion is unavoidable.

SUMMARY OF THE INVENTION

The present invention has been accomplished in view of the foregoing, and an object of the present invention is to provide a detection range adjusting system of an obstacle detection apparatus for a vehicle necessitating no bracket for aiming adjustment thereby having a good space efficiency and able to be made compact in which the installing work is easy, man-hour of the aiming work is reduced greatly and a high aiming accuracy is obtainable.

In order to achieve the above object, the present invention provides a detection range adjusting system of an obstacle detection apparatus for a vehicle having a transmitting-receiving unit mounted on the vehicle for transmitting a detection signal directed over a predetermined range and receiving a reflection signal of said detection signal, comprising a detection range setting means for processing said reflection signal and setting a detection range for detecting an obstacle which is included within said predetermined range and narrower than said predetermined range; a standard reflecting body positioned at a predetermined position relative to the vehicle; a standard position storing means for storing a standard position of said standard reflecting body in said detection range beforehand; and an adjustment instructing means for instructing transmission of a detection signal for adjustment of said detection range; setting of said detection range setting means being changed so that a detected position of said standard reflecting body in said detection range detected based on a reflection signal of said detection signal transmitted according to the instruction of said adjustment instructing means coincides with said standard position stored in said standard position storing means.

According to the present invention, the standard reflecting body and the vehicle are positioned in a predetermined positional mutual relation, the detection signal is transmitted in accordance with the instruction of the adjustment instructing means, the detected position of the standard reflecting body in the detection range is obtained from the reflection signal and setting of the detection range setting means is changed so that the detected position coincides with the standard position stored in the standard position storing means beforehand, thus directional adjustment of the detection range, namely aiming, is carried out.

The aiming is carried out by changing setting of the detection range setting means On software, instead of changing attitude of a transmitting-receiving unit, so that a special bracket for aiming adjustment is unnecessary and therefore, cost is reduced, space efficiency is improved, compactness can be achieved, installation work is easy and aiming work is simplified remarkably.

Transmission output level of the detection signal in accordance with instruction of the adjustment instructing means may be set lower than transmission output level of the detection signal at a normal obstacle detection mode. In this detection range adjusting system, the reflection signal from the standard reflecting body is received distinguished surely and an accurate aiming can be carried out.

An automatic adjustment control means for changing automatically the setting of the detection range setting means so that the detected position coincides with the standard position may be provided. In this detection range adjusting system, the aiming work can be done automatically without a human conveniently and an accurate aiming is possible.

An indicating means for indicating the detected position and a manual adjustment means capable of changing the setting of the detection range setting means manually may be provided. In this detection range adjusting system, it is possible for the operator to change the setting of the detection range setting means for aiming by manipulating the manual adjustment means watching the indicating means, therefore, the aiming work can be done easily and accurately.

BRIEF DESCRIPTION OF THE DRAWINGS

FIG. 4 is a rough block diagram showing a control system of an automatic aiming control;

FIG. 5 is a diagram for explaining a scan range and a detection range;

FIG. 6 is a flow chart showing control procedure of an aiming work;

FIG. 9 is an outside view of an aiming adjustment apparatus according to further another embodiment.

DETAILED DESCRIPTION OF PREFERRED EMBODIMENT

Hereinafter, a preferred embodiment of the invention will be described with reference to FIGS. 1–6.

Figure 1:
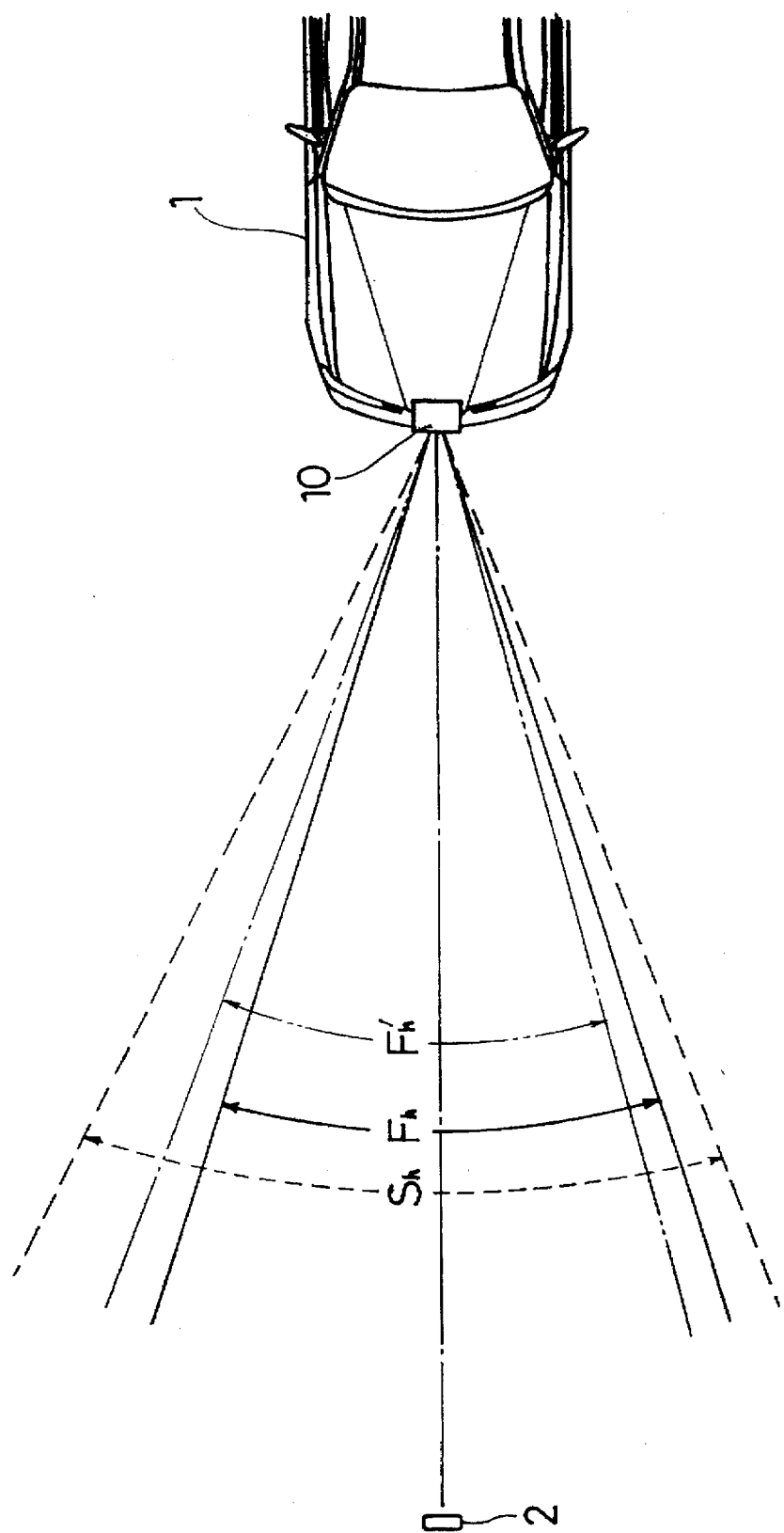
FIG. 1 is a plan view showing a part of a motorcar and a standard reflecting body on aiming work according to an embodiment of the invention.
Figure 2:
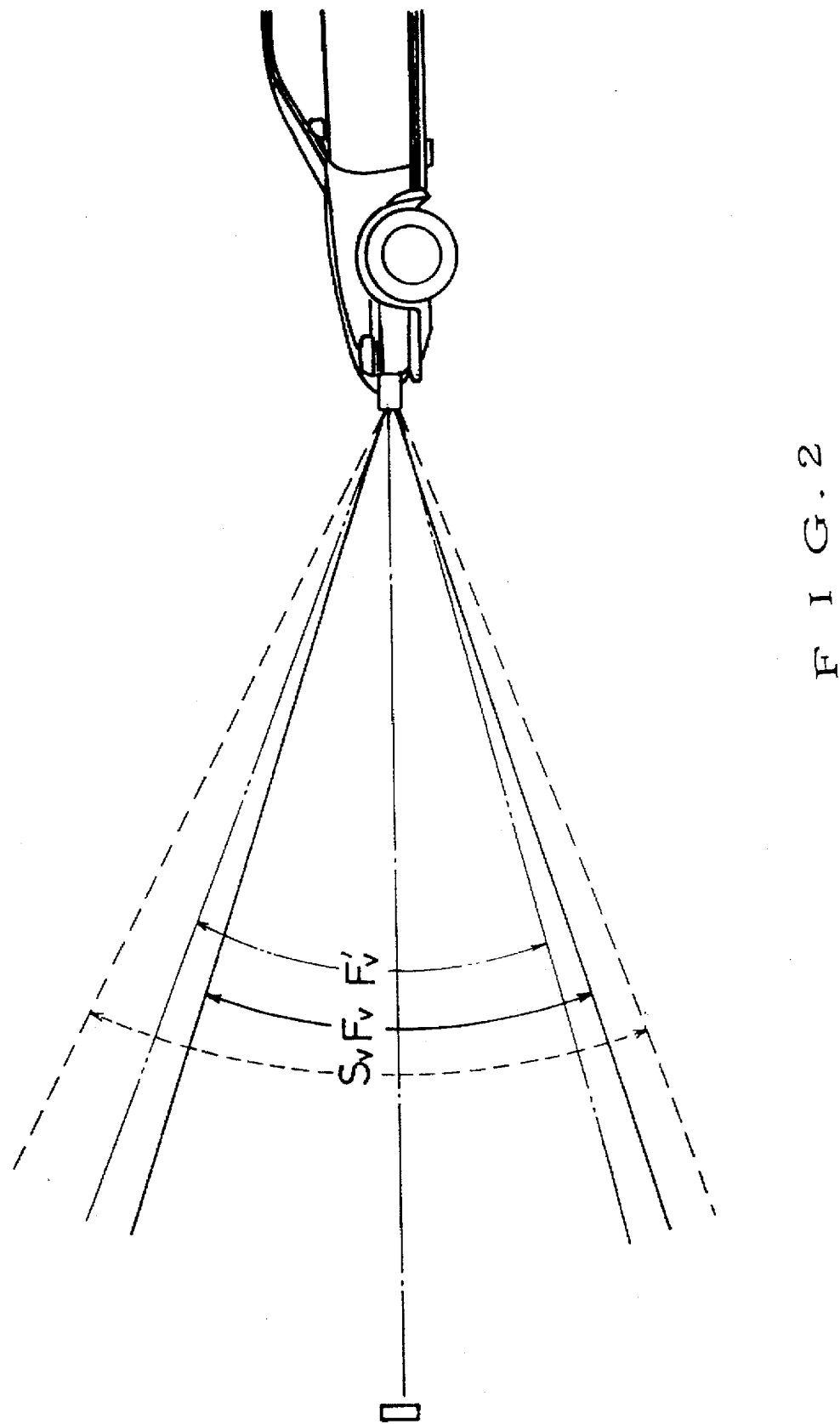
FIG. 2 is a side view of FIG. 1.

FIG. 1 is a plan view showing a motorcar 1 having a radar apparatus 10, which is a obstacle detection apparatus for vehicle according to an embodiment of the invention, mounted at the front center of the vehicle in a state that the motorcar is stopped at a predetermined position in front of a standard reflecting body 2 for aiming work. FIG. 2 is a side view thereof. In this embodiment, the standard reflecting body 2 is positioned just in front of the motorcar 1.

Figure 3:
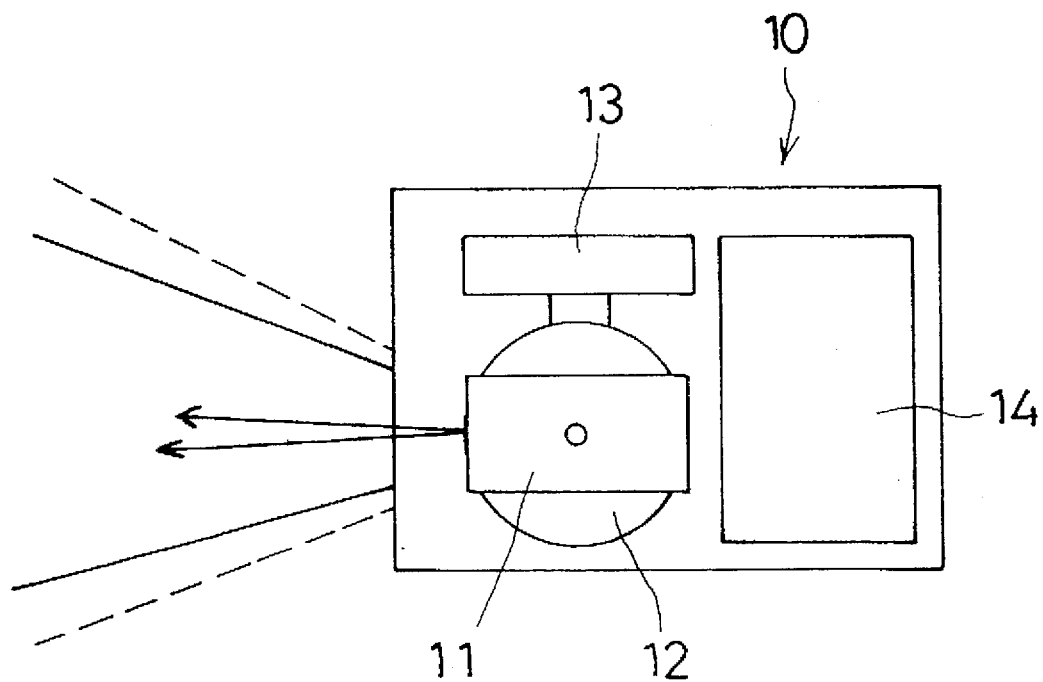
FIG. 3 is a rough sketch of a radar apparatus.

The radar apparatus 10 is of scan type as shown roughly in FIG. 3. A radar unit 11 transmits a radar beam which is a detection signal and receives a reflection signal thereof. The transmitted radar beam scans right and left in horizontal directions through a right-left scan unit 12 and scans up and down in vertical directions through an up-down scan unit 13. As for the scanning system, there are systems using a rotary mirror, a deflector utilizing diffraction or the like. In place of the scan system in which a single radar beam scans, a multibeam system in which a plurality of radar beams are transmitted at the same time or by turns is also available.

In rear of the radar unit 11 is arranged a radar control unit 14 by which the radar unit 11, the right-left scan unit 12 and the up-down scan unit 15 are driven and controlled and also a reflection signal of the radar beam is processed to detect an obstacle and its position. The aiming work is controlled by the radar control unit 14 so as to be carried out automatically.

Such a radar apparatus 10 is fixed to a front center of the motorcar 1 thereby a bracket or the like for aiming adjustment is not necessary. Therefore, the cost is lowered, a space for changing attitude of the apparatus is unnecessary, the apparatus can be made compact and the installing work is easy.

As described above, the radar beam transmitted from the radar unit 11 of the radar apparatus 10 mounted at the front center of the vehicle scans in front of the motorcar 1 right and left as well as up and down. In FIG. 1, an angle range Sh shown by dotted lines is a scan range in horizontal, an angle range Fh shown by solid lines is a detection range in horizontal before aiming and an angle range Fh' shown by chain lines is a detection range in horizontal after aiming.

Similarly, in FIG. 2, an angle range Sv shown by dotted lines is a scan range in vertical, an angle range Fv shown by solid lines is a detection range in vertical before aiming and an angle range Fv' shown by chain lines is a detection range in vertical after aiming.

The scan ranges Sh, Sv mean ranges over which the radar beam scans and the detection ranges Fh, Fv mean ranges in which actually processing of the reflection signal is carried out and detection of the obstacle is possible in the scan ranges Sh, Sv.

The detection ranges Fh, Fv are narrower than the scan ranges Sh, Sv, therefore, unnecessary signals in ranges other than the detection ranges Fh, Fv are omitted and only necessary signals are processed to shorten the signal processing time and secure a rapid response.

The scan ranges Sh, Sv cover sufficiently wide regions but the detection ranges Fh, Fv are limited to necessary minimum regions where detection of obstacles on the running way of the motorcar 1 is required. And it is the aiming work of the present invention to set the detection ranges Fh, Fv at predetermined optimum positions in the scan ranges Sh, Sv. The aiming work is carried out by the radar control unit through a computer automatically.

FIG. 4 is a rough block diagram showing a control system of the automatic aiming control. When radar beam transmitted from the radar unit 11 scans right and left as well as up and down through the scan units 12, 13 and the reflection signals are received by the radar unit 11, only signals within the detection ranges Fh, Fv set by a detection range setting means 21 of the radar control unit 14 are outputted for processing.

An automatic adjustment control means 20 processes the signals within the detection ranges Fh, Fv to extract a detected position of the standard reflecting body 2 in the detection ranges Fh, Fv and compares the detected position with a standard position stored in a standard position storing means 23 beforehand, and when a discrepancy is found between the standard and detected positions, the automatic adjustment control means 22 instructs the detection range setting means 21 to displace the detection ranges Fh, Fv.

The detection range setting means 21 changes the detection ranges Fh, Fv and sets new detection ranges Fh', Fv' in accordance with the instruction, and, in the next cycle, outputs signals within the renewed detection ranges Fh', Fv' to the automatic adjustment control means 22, which again processes the signals to extract a detected position of the standard reflecting body 2 in the new detection ranges Fh', Fv' and compares the detected position with the standard position.

The above procedure is repeated until the detected position of the standard reflecting body in the detection range coincides with the standard position, and thus the aiming is carried out.

In order to specify positions of obstacles and the standard reflecting body 2, as shown in FIG. 5 which relates to the aiming in right-left direction, a scan range Sh is divided into equal n areas and a detection range Fh is also divided into equal m areas. These areas are denoted by area numbers 1-m, 1-n respectively in order from one end till another end and a detected position in the detection range Fh is specified by the area number.

The detection range Fh is controlled in the scan range Sh so as to move by one area at a time. In FIG. 5 are shown a detection range Fh before aiming and a detection range Fh' after aiming which has been moved by one area toward younger number. The vertical scan range Sv and the detection range Fv are also divided into a plurality of areas respectively, and each of the areas is allotted its own area number.

Hereinafter, control procedure in the aiming work by the aforementioned aiming control system will be described in accordance with a flow chart of FIG. 6 with regard to the horizontal aiming. However it is similar regarding the vertical aiming too.

At first, the motorcar 1 is stopped so as to have a predetermined positional relation to the standard reflecting body 2. In the present embodiment, as shown in FIGS. 1 and 2, the motorcar 1 is stopped so that the standard reflecting body 2 is positioned just in front of the carbody at a predetermined distance.

The standard position p stored in the aforementioned standard position storing means 23 is the position where the standard reflecting body 2 will be detected by the radar apparatus 10 of the motorcar 1 which is stopped in the aforementioned positional relation to the standard reflecting body 2 if the detection range Fh is set most suitably. The standard position is determined beforehand and stored by an area number in the detection range Fh. In this embodiment, the area number m/2 of the detection range Fh shown in FIG. 5 is the standard position p.

As an adjustment instructing method for starting the aiming control, there is a method to operate any one of ordinary switches in unusual operation manner. For example, a certain switch may be pushed five times repeatedly or at a special timing, or two switches may be pushed simultaneously.

After the aiming control is started in a manner as described above, at Step 1 in the flow chart of FIG. 6, output of the radar unit 11 is set to a lower output compared with the case of a usual obstacle detection mode so as to detect no obstacle other than the standard reflecting body 2 and detect only the standard reflecting body 2 surely.

Next, the flow advances to Step 2 where the radar beam scans and the reflection signal is processed to detect the standard reflecting body within a detection range Fh having been set before.

At the following Step 3, whether two or more standard reflecting bodies are detected or not is discriminated. If two or more standard reflecting bodies are detected, the flow jumps to Step 11 for carrying out a fail processing to notify the fail state and the present aiming control is ended, because the position of the standard reflecting body 2 can not be specified.

When only one standard reflecting body is detected, it is judged that the normal detection is carried out, and the flow advances to Step 4 to extract a detected position q. If the standard reflecting body 2 is detected extending over a plurality of areas in the detection range Fh, the number of the area corresponding to the center of the detected body is calculated and regarded as the detected position q.

At Step 5, it is discriminated whether the detected position q coincides with the standard position p stored in the standard position storing means 23 or not, and if the both coincide with each other, it is regarded that the aiming was carried out normally and the flow advances to Step 6. Then, after the number of the detection start area is stored in a non-volatile memory, aiming completion is displayed at Step 7 to end the present aiming control.

When the detected position q does not coincide with the standard position p at Step 5, the flow advances to Step 8 to discriminate whether the detected position q is smaller than the standard position p or not. If the detected position q is smaller than the standard position, the flow advances to Step 9 to reduce the start area of the detection range Fh by one area and displace the detection range Fh toward the smaller area number of the scan range Sh, and then returns to Step 2.

Conversely, when it is discriminated that the detected position q is larger than the standard position p at Step 8, the flow advances to Step 10 to increase the start area of the detection range Fh by one area and displace the detection range Fh toward the larger area number of the scan range Sh.

Under a detection range Fh' newly set in such a manner as described above, scan and signal processing are carried out (Step 2), a detected position q' of the standard reflecting body is extracted (Step 4), the position q' is compared with the standard position p (Step 5), and when the positions q' and p are not coincide yet, steps for displacing the detection range are repeated until the detected position q coincides with the standard position p (Step 9, 10) and then the flow advances to Step 6, 7 from Step 5 to complete the aiming control.

On normal action after completion of the aiming control, the detected start area number is read out from the non-volatile memory and the detection is started from an area having the same area number. Thus a correct detection range can be set.

In the present embodiment, since the standard position p is m/2, if the previous detected position q is m/2−1 as shown in FIG. 5 for example, p is larger than q, therefore the flow advances from Step 7 to Step 8 and the start area of the detection range Fh is reduced by one area to displace the detection range Fh toward the smaller area number of the scan range Sh so that the detection range is changed to the detection range Fh' shown in FIGS. 1 and 5.

In detection range Fh', the detected position q' is m/2 and now the detected position coincides with the standard position p thus the detection range is adjusted to the optimum position.

The vertical aiming control is also carried out in a manner similar to the above. Since all aimings are carried out on software completely automatically, it is unnecessary for human to carry out aiming works so that human labor is reduced remarkably and conveniently and an accurate aiming without distribution can be achieved.

In this embodiment, since the motorcar 1 is stopped so that the standard reflecting body 2 is positioned just in front of the motorcar, the area number of the standard position p in the detection range is m/2, however, the positional relation between the standard reflecting body 2 and the motorcar 1 is not limited to the above positional relation and can be any other predetermined positional relation, and the area number of the standard position p in the detection range is set in accordance with the corresponding predetermined positional relation.

Next, another embodiment of the invention in which the aiming work is carried out semi-automatically will be described based on FIGS. 7 and 8.

Figure 7:
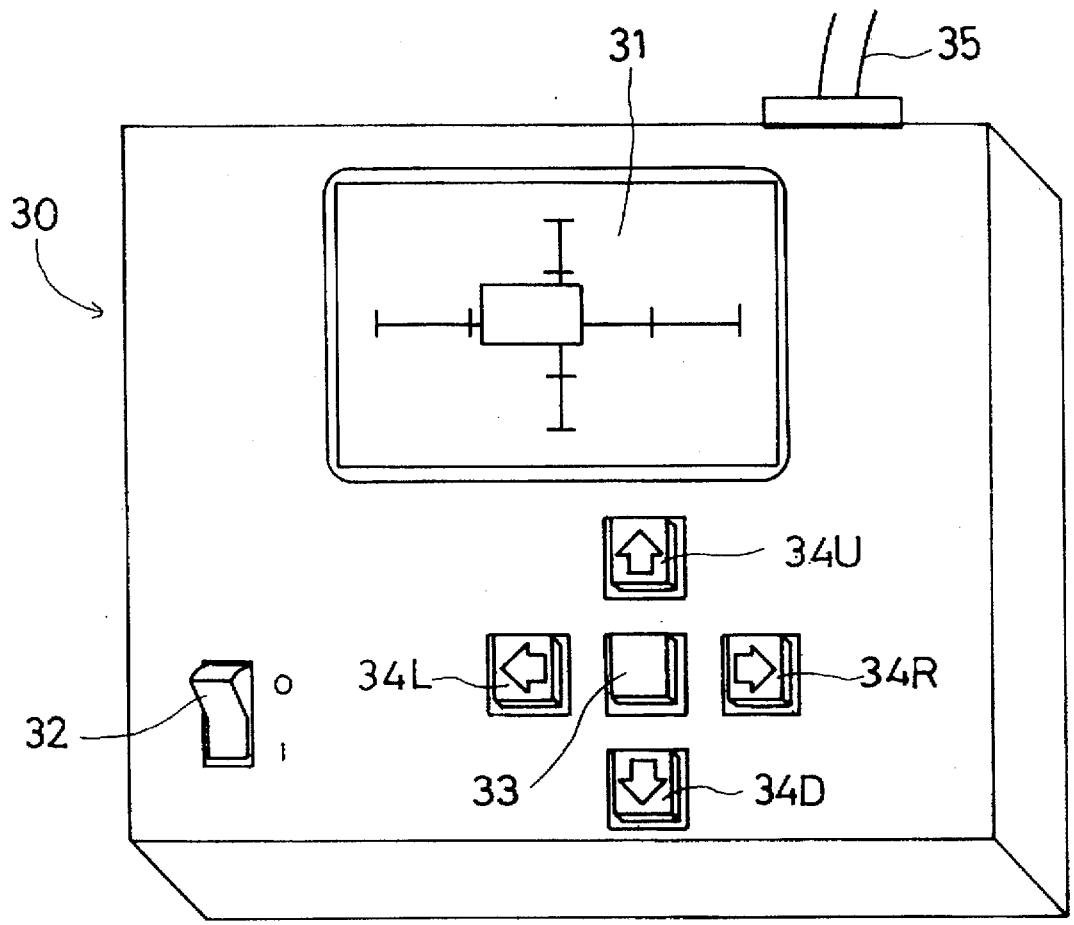
FIG. 7 is an outside view of an aiming adjustment apparatus according to another embodiment.
Figure 8:
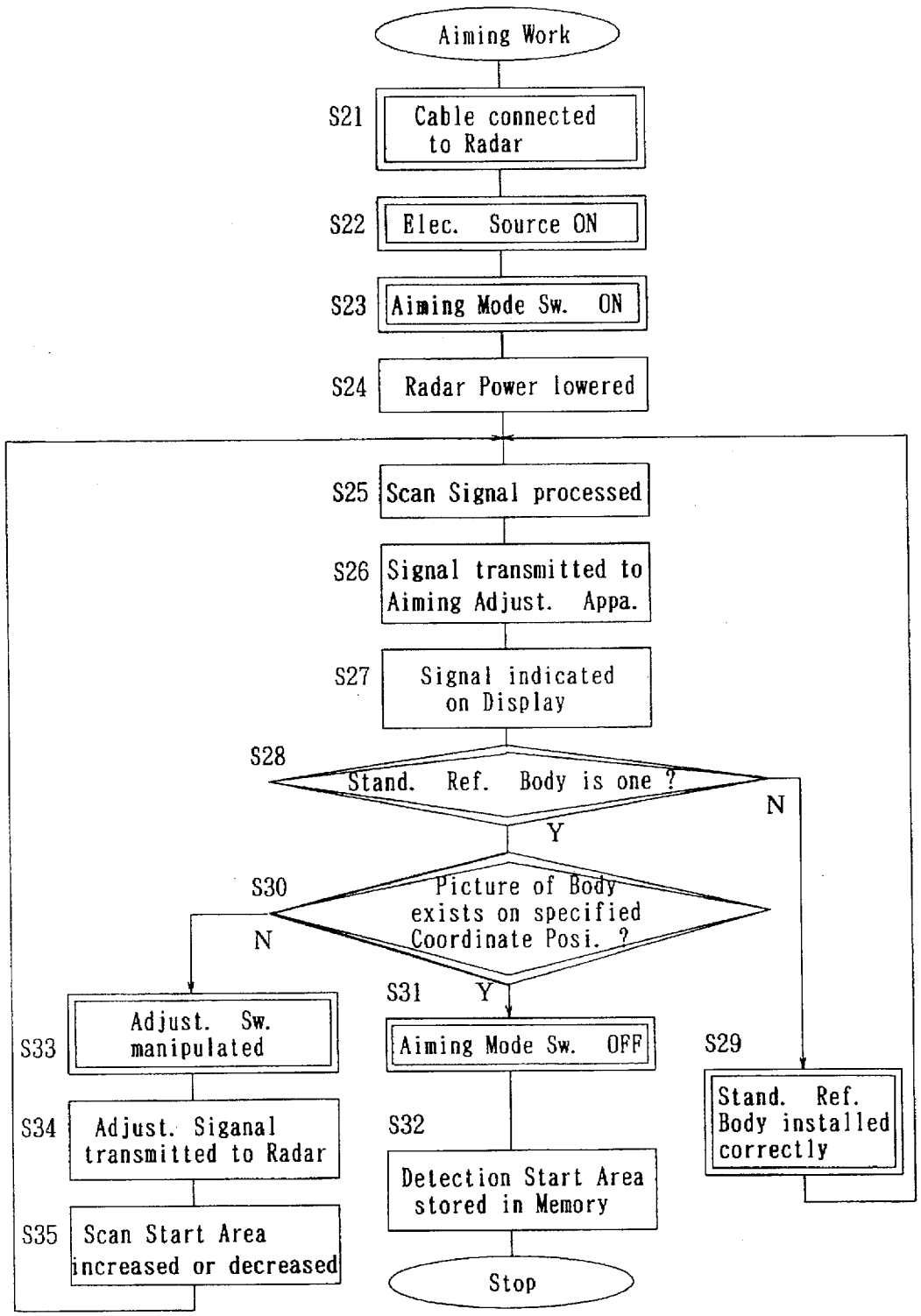
FIG. 8 is a flow chart showing control procedure of an aiming work in the same embodiment.

FIG. 7 shows an aiming adjustment apparatus 30 used in this embodiment. On a surface of a casing is provided a dot matrix display 31 having rectangular co-ordinates on which the position of the standard reflecting body obtained by processing the reflection signal in the detection range is indicated.

In addition, on the surface of the casing are provided a main switch 32 at the left side and an aiming mode switch 33 and adjusting switches 34L, 34R, 34U, 34D at the right side. A connection cable 35 extending from the aiming adjustment apparatus 30 is connected to a radar apparatus similar to the radar apparatus 10 in the aforementioned embodiment.

However, the radar control unit of the present embodiment is designed to carry out semi-automatic control instead of full-automatic control, so that the radar apparatus outputs position information signals obtained by processing signals in the detection range to the aiming adjustment apparatus 30 and the aiming adjustment apparatus 30 outputs on-off signals for switches and aiming adjusting signals to the radar apparatus.

In response to the aforementioned position information signal, a position of the standard reflecting body is indicated on the dot matrix display 31 of the aiming adjustment apparatus 30 as an rectangular picture at a position based on the position information. The origin of the co-ordinates indicated on the dot matrix display 31 is set at a standard position in the detection range stored beforehand.

Aiming work procedure in the above aiming adjustment apparatus 30 and radar apparatus will be described hereinafter with reference to the flow chart of FIG. 8.

At first, the connection cable 35 of the aiming adjustment apparatus 30 is connected with the radar apparatus (Step 21), electric source of the radar apparatus and the main switch 32 of the aiming adjustment apparatus 30 are turned on (Step 22), the aiming mode switch 33 is turned on (Step 23), and the radar output is set to a lower value compared with the case of normal obstacle detection, then the aiming work is commenced.

The radar apparatus makes the radar beam scan and processes the reflection signal in a detection range left in a condition set before to detect the standard reflecting body (Step 25), and transmits the result of the processing to the aiming adjustment apparatus 30 as a position information signal in the detection range (Step 26). The aiming adjustment apparatus 30 indicates the position information signal on the dot matrix display 31 as a picture (Step 27).

The standard reflecting body is indicated at a position based on the position information on the dot matrix display 31 as a rectangular picture as shown in FIG. 7.

An operator watches the indication on the dot matrix display 31 and discriminates whether the number of the picture of the standard reflecting body is one or not (Step 28). When the number is not one, the standard reflecting body 2 is positioned correctly once again (Step 29) and the radar beam is made scan again to detect the standard reflecting body (Step 25) until only one picture of the standard reflecting body is indicated.

When it is discriminated that the number of the picture of the standard reflecting body is one at Step 28, the flow advances to Step 30 and whether the picture of the standard reflecting body exists at a predetermined position on the coordinates or not is discriminated. Namely, whether the center of the rectangular picture of the standard reflecting body exists at about the origin of the co-ordinates indicated on the dot matrix display 31 or not is discriminated, because the standard position is set at the origin.

If the center of the rectangular picture of the standard reflecting body is positioned at about the origin, it is regarded that the correct aiming has been done and the aiming mode switch 33 is manipulated to turn off (Step 31) and the radar receives an aiming completion signal and stores the detection start area number into the non-volatile memory (Step 32), thus the aiming work is ended.

When the center of the rectangular picture of the standard reflecting body is not positioned about on the origin but shifted to left, right, up or down, the adjusting switches 34L, 34R, 34U, 34D of the aiming adjustment apparatus 30 is manipulated to change setting of the detection range (Step 33).

When the adjusting switch is manipulated, the adjusting signal is transmitted to the radar apparatus (Step 30), then in the apparatus, the scan start area of the detection range is increased or decreased by one area in accordance with the adjusting signal to change setting of the detection range (Step 35), and the flow returns to Step 15.

In such a newly set detection range, the above-mentioned steps are repeated until the center of the rectangular picture of the standard reflecting body is positioned about on the origin. When it is judged that the center is positioned about on the origin, the flow moves from Step 30 to Step 31 and the aiming mode switch 33 is manipulated to be turned off, then the detection start area number is stored in the non-volatile memory (Step 32) to finish the aiming work.

As described above, in this embodiment, after the motorcar is stopped at a predetermined relative position to the standard reflecting body, the operator carries out the aiming work of the detection range by manipulating the aiming adjustment apparatus 30 watching the dot matrix display 31 so that the aiming can be carried out easily and accurately.

Further, if necessary according to a running condition or an environmental condition, setting of the detection range can be shifted so as not to fit the predetermined standard position. It is very convenient.

In the above embodiment, aiming work of the detection range is carried out in both vertical and horizontal directions, but FIG. 9 shows an aiming adjustment apparatus 40 which carries out the aiming work only in the horizontal direction. The aiming adjustment apparatus 40 has an oblong dot matrix display 41 on a surface of a casing and on the dot matrix display 41 is shown a co-ordinate directed right and left for indicating the position of the standard reflecting body which is obtained by processing the reflection signal in the detection range.

In addition, a main switch 42 is provided at the left side of the casing surface, and at the right side of the casing surface, there are arranged left and right adjusting switches 44L, 44R and a aiming mode switch 43 positioned between them. A connecting cable 45 extends from the aiming adjustment apparatus 40 to be connected with the radar apparatus.

This aiming adjustment apparatus 40 is used in the same manner as the aforementioned embodiment, but only horizontal aiming work is carried out. When the vertical detection range is to be fixed, the aiming adjustment apparatus 40 is convenient and of low cost.

In the aforementioned embodiment, the motorcar 1 is stopped at a predetermined position relatively to the standard reflecting body 2, however the standard reflecting body 2 may be moved to a predetermined position relatively to the motorcar 1. Further, in the aiming adjustment mode, a control in which the detection range covers the entire scan range may be carried out.

When aiming is carried out with the standard reflecting body placed at a predetermined position just in front of the radar apparatus, the detection range in the aiming mode may be limited to a narrow range spreading from the radar apparatus just in front radially with an angle corresponding to the difference between the angles Sh and Fh, that is, an angle by which the detection range Fh at the normal mode can be moved within the scan range Sh. In such a way, a very efficient aiming can be carried out.

According to the present invention, aiming is carried out by changing setting of the detection range setting means on software, instead of changing attitude of a transmitting-receiving unit, so that a special bracket for aiming adjustment is unnecessary and therefore, cost is reduced, space efficiency is improved, compactness can be achieved, installation work is easy and aiming work is simplified greatly.

Provided that transmission output level of the detection signal depending on the instruction of the adjustment instruction means is set lower than transmission output level of the detection signal at the normal obstacle detection mode, the reflection signal from the standard reflecting body is received distinguished surely and an accurate aiming can be carried out.

When an automatic adjustment control means for changing automatically the setting of the detection range setting means so that the detected position coincides with the standard position is provided, the aiming work can be done automatically without a human conveniently and an accurate aiming is possible.

When an indicating means for indicating the detected position and a manual adjustment means capable of changing the setting of the detection range setting means manually are provided, an operator can change the setting of the detection range setting means for aiming by manipulating the manual adjustment means watching the indicating means, therefore, the aiming work can be done easily and accurately.

What is claimed is:

1. A detection range adjusting system of an obstacle detection apparatus for a vehicle having a transmitting-receiving unit mounted on the vehicle for transmitting a detection signal directed over a predetermined range and receiving a reflection signal of said detection signal, comprising:

a detection range setting means for processing said reflection signal and setting a detection range for detecting an obstacle which is included within said predetermined range and narrower than said predetermined range;

a standard reflecting body positioned at a predetermined position relative to the vehicle;

a standard position storing means for storing a standard position of said standard reflecting body in said detection range beforehand; and an adjustment instructing means for instructing transmission of a detection signal for adjustment of said detection range;

setting of said detection range setting means being changed so that a detected position of said standard reflecting body in said detection range detected based on a reflection signal of said detection signal transmitted according to the instruction of said adjustment instructing means coincides with said standard position stored in said standard position storing means.

2. A detection range adjusting system of an obstacle detection apparatus for a vehicle claimed in claim 1, wherein transmission output level of said detection signal dependent on the instruction of said adjustment instructing means is set lower than transmission output level of said detection signal at a normal obstacle detection mode.

3. A detection range adjusting system of an obstacle detection apparatus for a vehicle claimed in claim 1 or 2, having an automatic adjustment control means for changing automatically the setting of said detection range setting means so that said detected position coincides with said standard position.

4. A detection range adjusting system of an obstacle detection apparatus for a vehicle claimed in claim 1 or 2, having an indicating means for indicating said detected position and a manual adjustment control means capable of changing the setting of said detection range setting means manually.

* * * * *